United States Patent
Choi

(10) Patent No.: US 7,683,584 B2
(45) Date of Patent: Mar. 23, 2010

(54) POWER SOURCE SWITCHING APPARATUS AND METHOD THEREOF

(75) Inventor: Jong-Sang Choi, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 599 days.

(21) Appl. No.: 11/508,920

(22) Filed: Aug. 24, 2006

(65) Prior Publication Data

US 2007/0046264 A1 Mar. 1, 2007

(30) Foreign Application Priority Data

Aug. 24, 2005 (KR) .................. 10-2005-0078047

(51) Int. Cl.
*H02J 7/06* (2006.01)
*H02J 7/00* (2006.01)
*H02J 3/32* (2006.01)
*H02J 9/00* (2006.01)

(52) U.S. Cl. .................. 320/163; 320/128; 320/158; 307/46; 307/48; 307/66

(58) Field of Classification Search ......... 320/127–128, 320/132, 134–136, 140, 151–152, 156–159, 320/161–163; 307/43–66, 70, 75, 85–87
See application file for complete search history.

(56) References Cited

U.S. PATENT DOCUMENTS 4,617,473 A * 10/1986 Bingham ................ 307/66
6,462,434 B1 * 10/2002 Winick et al. .......... 307/85
7,332,833 B2 * 2/2008 Pan et al. ................ 307/65

FOREIGN PATENT DOCUMENTS

| JP | 02-095172 | 4/1990 |
|----|-----------|--------|
| JP | 09-322423 | 12/1997 |
| JP | 2002-199602 | 7/2002 |
| JP | 2003-348768 | 12/2003 |
| KR | 10-2006-0032519 A | 4/2006 |

* cited by examiner

*Primary Examiner*—Patrick J Assouad
*Assistant Examiner*—Richard V Muralidar
(74) *Attorney, Agent, or Firm*—Harness, Dickey & Pierce

(57) ABSTRACT

A power source switching apparatus is provided. The example power source switching apparatus may include a voltage adjuster outputting a first power source voltage having a voltage level, corresponding to the output voltage of a battery, during an external power source mode where the battery is being charged, the first power source voltage based at least in part on the external power source and the output voltage of the battery, a controller outputting a first control signal and a second control signal, the first control signal enabled if the battery is operating in the external power source mode and the second control signal is enabled if the battery is not operating in the external power source mode, a first switch outputting the first power source voltage if the first control signal is enabled and a second switch outputting the output voltage of the battery if the second control signal is enabled.

24 Claims, 8 Drawing Sheets

US 7,683,584 B2

POWER SOURCE SWITCHING APPARATUS AND METHOD THEREOF

PRIORITY STATEMENT

This application claims the benefit of Korean Patent Application No. 10-2005-0078047, filed on Aug. 24, 2005, in the Korean Intellectual Property Office, the disclosure of which is incorporated herein in its entirety by reference.

BACKGROUND OF THE INVENTION

1. Field of the Invention

Example embodiments of the present invention are directed generally to a power source switching apparatus and method thereof, and more particularly to a power source switching apparatus and method of providing power.

2. Description of the Related Art

A portable mobile device may be used in places where an external power source voltage may not be available because the portable mobile device may be configured to operate with an internal power source voltage applied by a battery. Portable mobile devices may be configured to use rechargeable batteries and/or disposable batteries. Rechargeable batteries may typically be charged by external power source voltages. A charge capacity of rechargeable batteries may typically be relatively limited, and therefore rechargeable batteries may need to be recharged from time to time as charges stored therein are exhausted.

For example, a user may charge a rechargeable battery during a period where the portable mobile device may be powered by an external power source voltage. In other words, the portable mobile device may draw power from the external power source to both power the portable mobile device as well as charge the rechargeable battery.

FIG. 1 is a block diagram illustrating a conventional portable mobile device. Referring to FIG. 1, the portable mobile device may include a voltage drop diode 120, a controller 130, a battery charger 140, a battery 150, a direct current (DC)-DC converter 160, a system load 170, and a switch SW1.

Referring to FIG. 1, the voltage drop diode 120 may be used if charges are supplied to the battery 150 via the battery charger 140 while the portable mobile device is powered by an external power source 110. An operating voltage of the system load 170 may be lower than a voltage of the external power source 110 in order to reduce power consumption of the system load 170. Accordingly, the voltage of the external power source 110 may be reduced or dropped using at least one voltage drop diode 120 connected in series, and the reduced voltage may then be supplied to the system load 170. The controller 130 may generate a control signal CON for selecting one of the voltage of the external power source 110 (e.g., applied through the voltage drop diode 120) and the voltage of the battery 150.

Referring to FIG. 1, the battery charger 140 may charge the battery 150 using the external power source 110. During charging, the battery 150 may receive charges from the battery charger 140. The battery 150 may output a voltage corresponding to a voltage level at which the battery 150 is charged. The switch SW1 may supply one of the output voltage of the battery 150 and the output voltage of the voltage drop diode 120 to the DC-DC converter 160, in response to the control signal CON output from the controller 130. The DC-DC converter 160 may convert the voltage supplied through the switch SW1 into a voltage having a level which may be sufficient to power the system load 170. The system load 170 may indicate a functional block which may perform a specific function using the voltage supplied from the DC-DC converter 160.

FIG. 2 is a block diagram illustrating another conventional portable mobile device. Referring to FIG. 2, the output voltage of a voltage drop diode 220 may be directly supplied to a system load 270 through a switch SW2, and the output voltage of a battery 250 may be supplied to a DC-DC converter 260 through a second switch SW3. The two switches SW2 and SW3 may be controlled by a control signal CON output from a controller 230 and a signal which may be obtained by inverting a phase of the control signal CON through an inverter 280, respectively. Accordingly, the first switch SW2 and the second switch SW3 may be turned on and off, respectively, or vice versa.

The conventional portable mobile devices illustrated in FIGS. 1 and 2 may each have (i) a battery mode in which the portable mobile device may be powered by a battery and (ii) an external power source mode in which the battery may be charged via the external power source while the portable mobile device is either operating via the external power source or not operating. During a transition between the battery mode and the external power source mode (e.g., in response to plugging in or unplugging the portable mobile device), a voltage supplied to the DC-DC converter 160 or the system load 270 may change at a relatively high rate.

FIGS. 3A, 3B and 3C illustrate a supplied voltage during a first transition from a battery mode to an external power source mode and a second transition from the external power source mode back to the battery mode. In an example, the supplied voltage illustrated in FIG. 3 may represent a voltage applied to the DC-DC converter 160 and/or the system load 270.

FIG. 3A illustrates a theoretical voltage level fluctuation of the power source voltage applied during a transition between the battery mode and the external power source mode. The theoretical voltage level of FIG. 3A is not intended to represent a capability of the conventional art, but is rather intended to illustrate a conceptual "ideal" voltage transition having a linear or "smooth" voltage change during a power source transition.

Referring to FIG. 3A, in a battery mode Bat_mode, a level of the power source voltage applied to the system may gradually be reduced over time. The external power source mode Recharge_mode for charging may be initiated before the voltage reaches a lower threshold voltage $V_{RL}$. In the external power source mode Recharge_mode, the voltage of the battery may increase, and the external power source mode Recharge_mode may be switched to the battery mode Bat_mode before the voltage reaches a higher threshold voltage $V_{RH}$. In an example, the lower threshold voltage $V_{RL}$ may represent a minimum voltage level required to power the portable mobile device and the higher threshold $V_{RH}$ may represent a voltage level above which the portable mobile device may not be capable of safe operation.

However, in a real-world environment, the external power source may have a voltage level at least equal to the lower voltage $V_{RH}$ because, typically, a voltage used to charge a battery may be set to a voltage level higher than a voltage level to which the battery is configured to be charged. Hereinafter, it may be assumed that the external power source voltage may be set to Vpp.

FIG. 3B illustrates a conventional voltage level fluctuation of the power source voltage applied during a transition between the battery mode and the external power source mode.

Referring to FIG. 3B, in the instant when the battery mode is switched to the external power source mode or the instant when the external power source mode is switched to the battery mode, a voltage level of the external power source voltage may spike (e.g., rapidly change). Furthermore, because the power source voltage may be set to Vpp, which may be higher than the lower voltage $V_{RH}$, in the external power source mode Recharge_mode, the battery may be charged by the power source voltage Vpp but the power source voltage Vpp may be too high to safely supply power to the portable mobile device. Accordingly, the portable mobile device may be inoperable during battery charging because the voltage used to charge the battery may be unsuitable to power the portable mobile device.

FIG. 3C illustrates another conventional voltage level fluctuation of the power source voltage applied during a transition between the battery mode and the external power source mode.

Referring to FIG. 3C, if the external power source voltage is reduced to the same voltage as the lower voltage $V_{RH}$ using a plurality of voltage drop diodes which are connected to each other in series, the power source voltage (e.g., set to $V_{RH}$) may be supplied to a system load of the portable mobile device. Accordingly, because the external power source voltage may be maintained at the lower voltage $V_{RH}$, the external power source voltage may be applied to the system while the battery is charged (e.g., although the charging of the battery may take a longer period of time due to the lower charging voltage). However, in FIG. 3C, similar to FIG. 3B, in the instant of switching the battery mode to the external power source mode or switching the external power source mode to the battery mode, the power source voltage may spike or change rapidly, thereby degrading a performance of the portable mobile device.

SUMMARY OF THE INVENTION

An example embodiment of the present invention is directed to a power source switching apparatus, including a battery storing charges received from an external power source and outputting a voltage corresponding to the stored charges, a voltage adjuster outputting a first power source voltage having a voltage level, corresponding to the output voltage of the battery, during an external power source mode where the battery is being charged, the first power source voltage based at least in part on the external power source and the output voltage of the battery, a controller outputting a first control signal and a second control signal, the first control signal enabled if the battery is operating in the external power source mode and the second control signal is enabled if the battery is not operating in the external power source mode, a first switch outputting the first power source voltage if the first control signal is enabled and a second switch outputting the output voltage of the battery if the second control signal is enabled.

Another example embodiment of the present invention is directed to a method of providing power, including providing a first power source voltage if a battery is not being charged by an external power source voltage, the first internal power source voltage output by the battery and providing a second power source voltage if the battery is being charged by the external power source voltage, the second power source voltage corresponding to a voltage level of the first power source voltage and not provided from the battery.

Another example embodiment of the present invention is directed to a power source switching apparatus in which a power source voltage may not be rapidly changed when a battery mode and an external power source mode are mutually switched.

Another example embodiment of the present invention is directed to a power source switching method in which a power source voltage may not be rapidly changed when a battery mode and an external power source mode are mutually switched.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Example embodiments of the present invention are described more fully hereinafter with reference to the accompanying drawings, in which example embodiments of the present invention are shown. Example embodiments of the present invention may, however, be embodied in many different forms and should not be construed as limited to the example embodiments set forth herein. Rather, these example embodiments are provided so that this disclosure will be thorough and complete, and will fully convey the scope of the invention to those skilled in the art. Like numbers refer to like elements throughout.

It will be understood that although the terms first and second are used herein to describe elements and should not be limited by these terms. These terms are used to distinguish one element from another. Thus, a first element discussed below could be termed a second region, layer or section, and similarly, a second element may be termed a first element without departing from the teachings of the present invention.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 4:
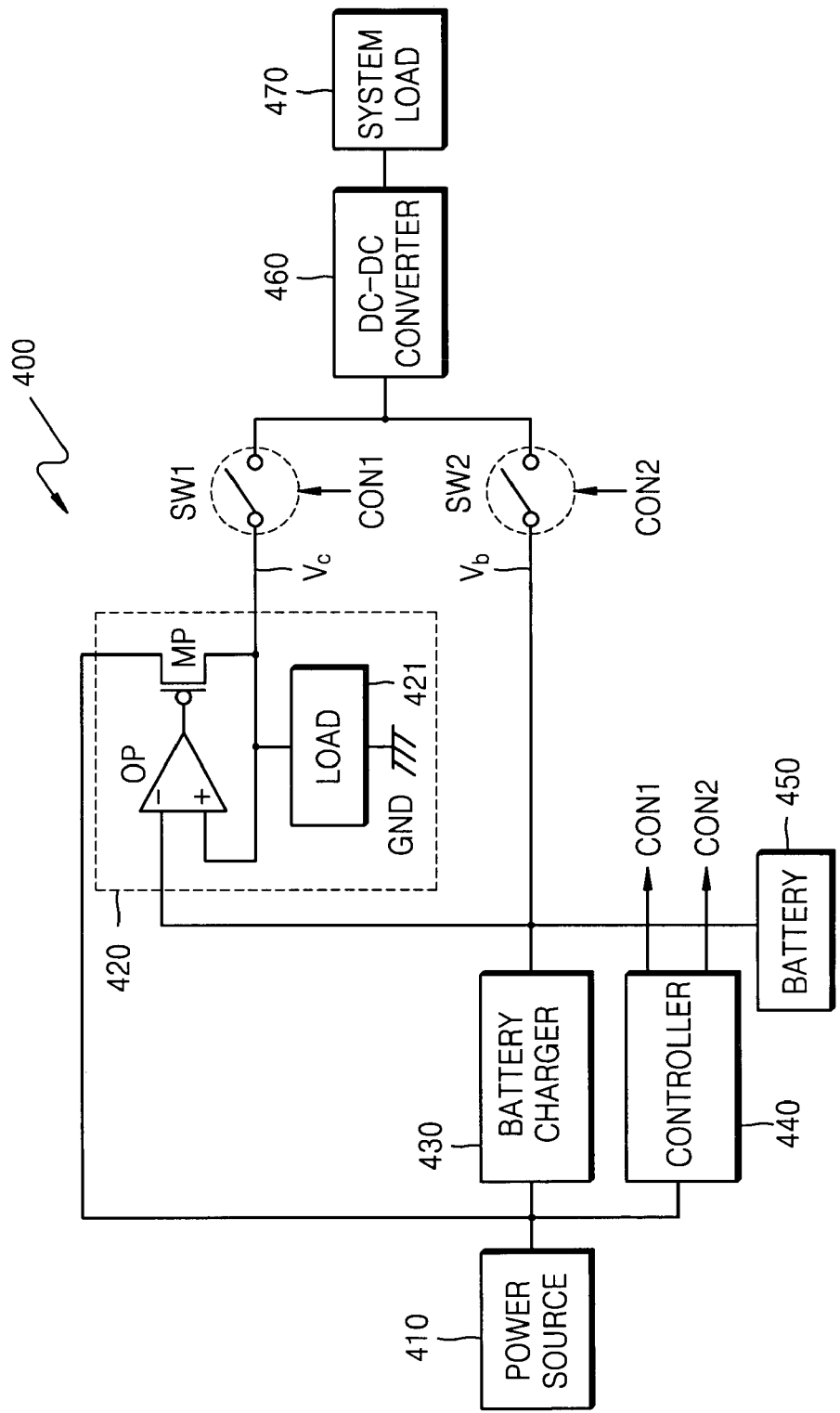
FIG. 4 illustrates a power source switching apparatus according to an example embodiment of the present invention.

FIG. 4 illustrates a power source switching apparatus 400 according to an example embodiment of the present invention.

In the example embodiment of FIG. 4, the power source switching apparatus 400 may include an external power source 410, a voltage adjuster 420, a battery charger 430, a controller 440, a battery 450, a DC-DC converter 460, a system load 470, a first switch SW1 and a second switch SW2.

In the example embodiment of FIG. 4, the external power source 410 may supply a power source voltage to the power source switching apparatus 400. In an example, a voltage Vpp of the external power source 410 may be at least equal to a lower voltage $V_{RH}$ output from the battery 450 (e.g., wherein the lower voltage $V_{RH}$ may represent a minimum voltage capable of being output from the battery 450).

In the example embodiment of FIG. 4, the voltage adjuster 420 may output a first power source voltage Vc having the same voltage level as that of the output voltage of the battery 450 during a charging of the battery 450, based on output voltages of the external power source 410 and the battery charger 430. The voltage adjuster 420 may include an operational amplifier OP, a P-type MOS transistor MP, and a load 421. A first input terminal (−) of the operational amplifier OP may receive the output voltage Vb of the battery 450. The source terminal of the P-type MOS transistor MP may be connected to the external power supply 410, and the drain terminal thereof may be connected to a second input terminal (+) of the operational amplifier OP, thereby outputting the first power source voltage Vc. The output voltage of the operational amplifier OP may be applied to the gate terminal of the P-type MOS transistor MP. A first terminal of the load 421 may be connected to a node for connecting the second input terminal (+) of the operational amplifier OP with the drain terminal of the P-type MOS transistor MP, and a second terminal of the load 421 may be connected to a ground voltage GND. Although not illustrated, the load 421 may be alternatively embodied as a capacitor with a first terminal connected to a node for connecting the second input terminal of the operational amplifier OP with the drain terminal of the P-type MOS transistor MP and a second terminal connected to the ground voltage GND and/or a resistor connected to the capacitor in parallel.

In the example embodiment of FIG. 4, the battery charger 430 may supply charges received from the external power source 410 to the battery 450. The controller 440 may output a first control signal CON1. In an example, the first control signal CON1 may be enabled (e.g., set to a first logic level, such as a higher logic level or logic "1") in the external power source mode and a second control signal CON2 may be enabled (e.g., set to the first logic level) in the battery mode. The battery 450 may store the charges received from the external power source 410 and/or the charges received from the battery charger 430, and may output the voltage Vb corresponding to the stored charges.

In the example embodiment of FIG. 4, the first switch SW1 may switch the first power source voltage Vc (e.g., received at a first end thereof) and may transfer the first power source voltage Vc to the DC-DC converter 460 (e.g., connected to a second end thereof), in response to the first control signal CON1. The second switch SW2 may switch the output voltage Vb of the battery 450 (e.g., connected to a first end thereof) and may transfer the output voltage Vb to the DC-DC converter 460 (e.g., connected to a second end thereof), in response to the second control signal CON2. A voltage selected by the first switch SW1 and the second switch SW2 may be referred to as a switching voltage. Because the first switch SW1 and the second switch SW2 may configured such that only one of the first and second switches SW1 and SW2 may be turned on or enabled at any given time, only one switched or transferred voltage may be applied to the DC-DC converter 460.

In the example embodiment of FIG. 4, the DC-DC converter 460 may generate a conversion voltage having a voltage level different from that of the received switching voltage. In an example, the level of the switching voltage may be higher than that of the conversion voltage. In a further example, the system load 470 may perform an operation based on the conversion voltage output by the DC-DC converter 460.

Figure 5:
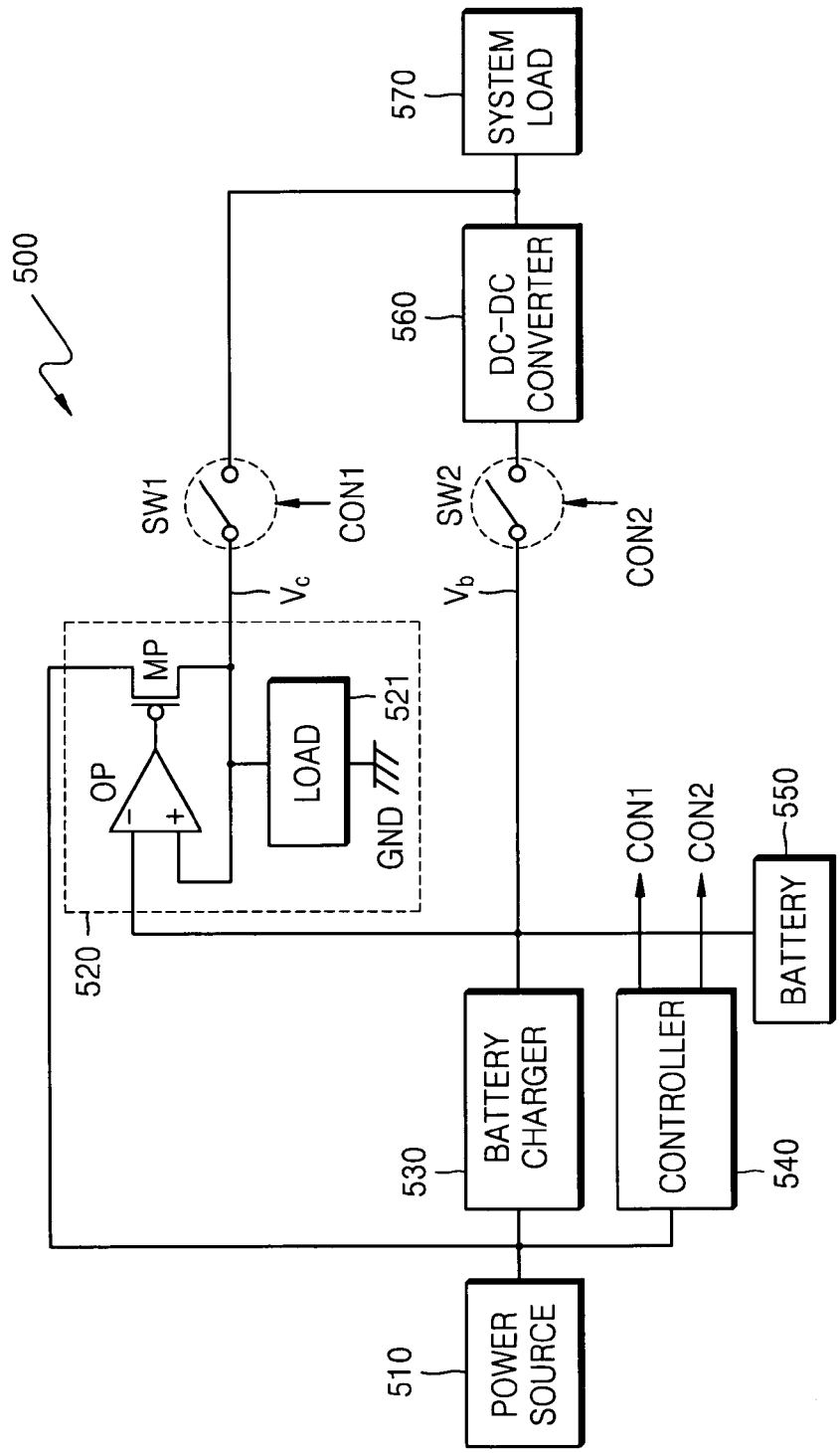
FIG. 5 illustrates a power source switching apparatus according to another example embodiment of the present invention.

FIG. 5 illustrates a power source switching apparatus 500 according to another example embodiment of the present invention.

In the example embodiment of FIG. 5, the power source switching apparatus 500 may include an external power source 510, a voltage adjuster 520, a battery charger 530, a controller 540, a battery 550, a DC-DC converter 560, a system load 570, a first switch SW1, and a second switch SW2.

The example embodiment illustrated in FIG. 5 may differ from the example embodiment illustrated in FIG. 4 in that the first switch SW1 may deliver the first voltage Vc to the system load 570 directly (e.g., bypassing the DC-DC converter 560) and the second switch SW2 may deliver the output voltage Vb of the battery 550 to the DC-DC converter 560. In contrast, each of the first and second switches SW1 and SW2 may output respective switching voltages to the DC-DC converter 460 in the example embodiment of FIG. 4. Other elements present in FIG. 5 corresponding to elements in FIG. 4 may be considered to be identical for the purposes of explanation. Accordingly, the external power source 510, the voltage adjuster 520, the battery charger 530, the controller 540, the battery 550, a the system load 570, and the second switch SW2 in the example embodiment of FIG. 5 may be configured in a manner identical to that of the external power source 410, the voltage adjuster 420, the battery charger 430, the controller 440, the battery 450, a the system load 470, and the second switch SW2 in the example embodiment of FIG. 4.

In example operation of the power source switching apparatus 400 illustrated in FIG. 4, in the battery mode, the voltage Vb output from the battery 450 may be delivered to the DC-DC converter 460 via the second switch SW2, which may operate in response to the second control signal CON2. In the external power source mode, the first power source voltage Vc output from the voltage adjuster 420 may be delivered to the DC-DC converter 460 via the first switch SW1, which may operate in response to the first control signal CON1.

In example operation of the power source switching apparatus 500 illustrated in FIG. 5, in the battery mode, the voltage Vb output from the battery 550 may be delivered to the DC-DC converter 560 via the second switch SW2, which may operate in response to the second control signal CON2. In the external power source mode, the first power source voltage Vc output from the voltage adjuster 520 may be delivered to the system load 570 via the first switch SW1, which may operate in response to the first control signal CON1.

Because the voltage levels of the first power source voltages Vc output from the voltage adjusters 420 and 520 may be substantially the same as the voltages Vb output from the charging batteries 450 and 550, a voltage fluctuation during a transition between battery mode and external power source mode within the power source switching apparatuses 400 and 500 may not experience a rapid voltage change or spike.

In the example embodiments of FIGS. 4 and 5, the output voltages Vb of the charging batteries 450 and 550 may be applied to the input terminals (−) of the respective operational amplifiers OP. Because the operational amplifiers OP may feedback via the P-type MOS transistor MP, the output voltages of the operational amplifiers OP may have substantially the same levels as those of the output voltages Vb of the charging batteries 450 and 550.

Figure 6:
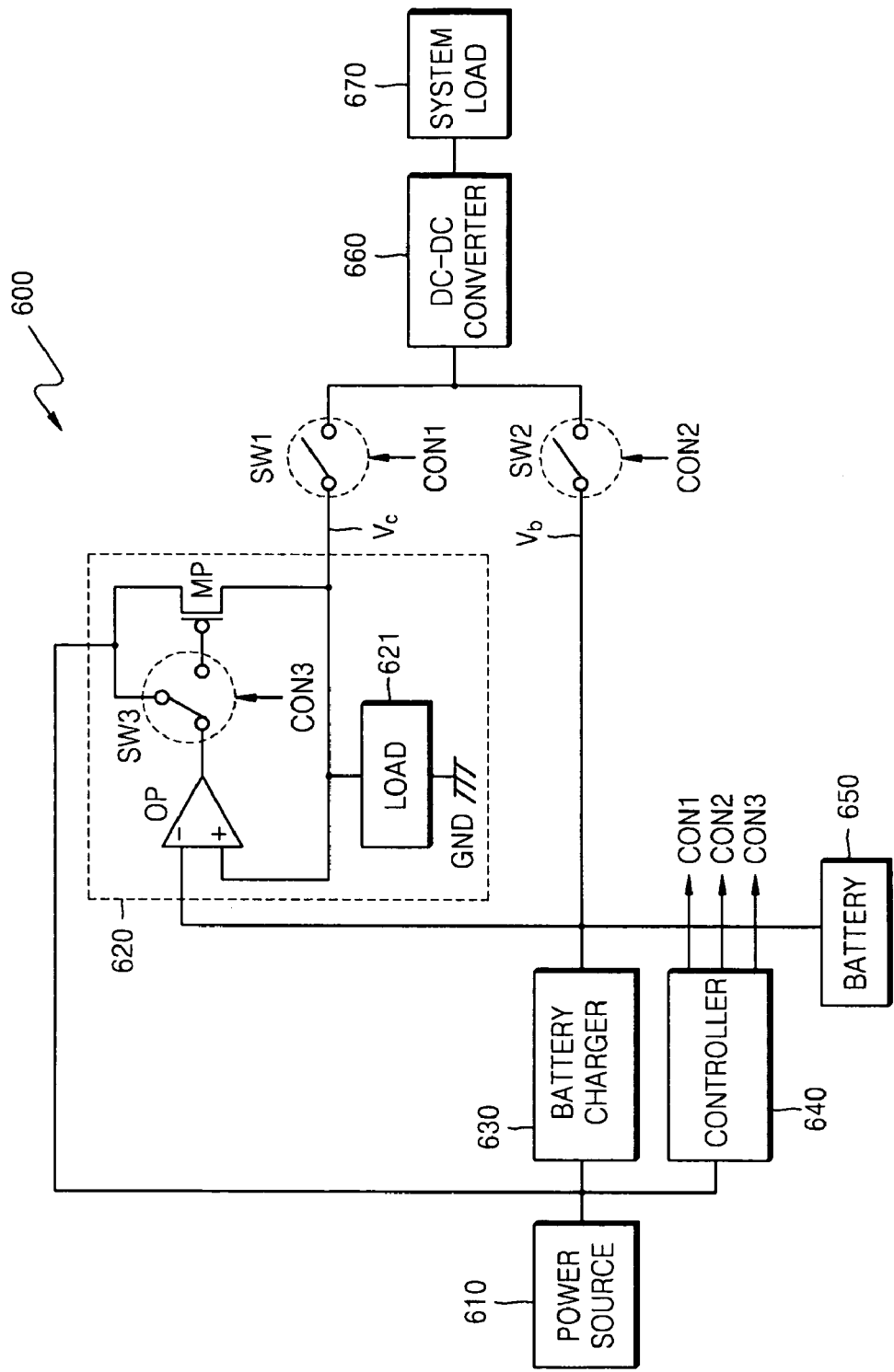
FIG. 6 illustrates a power source switching apparatus according to another example embodiment of the present invention.

FIG. 6 illustrates a power source switching apparatus 600 according to another example embodiment of the present invention.

In the example embodiment of FIG. 6, the power source switching apparatus 600 may include an external power source 610, a voltage adjuster 620, a battery charger 630, a controller 640, a battery 650, a DC-DC converter 660, a system load 670, a first switch SW1, and a second switch SW2.

In the example embodiment of FIG. 6, the external power source 610 may supply a power source voltage to the power source switching apparatus 600. In an example, the voltage Vpp of the external power source 610 may be at least equal to a lower voltage $V_{RH}$ output from the battery 650 (e.g., wherein the lower voltage $V_{RH}$ may represent a minimum voltage capable of being output from the battery 650).

In the example embodiment of FIG. 6, the voltage adjuster 620 may output a first power source voltage Vc having substantially the same level as that of the output voltage Vb of the battery 650 during a charging of the battery 650. The first power source voltage Vc may be based on a third control signal CON3 and the output voltages of the external power source 610 and the battery 650. The voltage adjuster 620 may include an operational amplifier OP, a P-type MOS transistor MP, a third switch SW3, and a load 621. A first input terminal (−) of the operational amplifier OP may receive the output voltage Vb of the battery 650. The source terminal of the P-type MOS transistor MP may be connected to the external power supply 610, the drain terminal thereof may be connected to the second input terminal (+) of the operational amplifier OP. The third switch SW3 may switch one of the output voltages of the external power source 610 and the operational amplifier OP and may deliver the output voltage Vc to the gate terminal of the P-type MOS transistor MP. The source terminal of the P-type MOS transistor MP may be connected to the external power supply 610, and the drain terminal thereof may be connected to the second input terminal (+) of the operational amplifier OP, thereby outputting the first power source voltage Vc.

In the example embodiment of FIG. 6, a first terminal of the load 621 may be connected to a node for connecting the second input terminal (+) of the operational amplifier OP with the drain terminal of the P-type MOS transistor MP, and a second terminal of the load 621 may be connected to a power source terminal GND. In an example, the load 621 may be embodied as a capacitor (not illustrated) with a first terminal connected to a node for connecting the second input terminal (+) of the operational amplifier OP with the drain terminal of the P-type MOS transistor MP and with a second terminal connected to the power source terminal GND and/or a resistor connected to the capacitor in parallel.

While the example embodiment of FIG. 6 illustrates the output terminal of the operational amplifier OP connected with the P-type MOS transistor MP, it is understood that another example embodiment of the present invention may include an N-type MOS transistor in place of the P-type MOS transistor MP (e.g., wherein the signals applied to the two input terminals (+) and (−) of the operational amplifier OP may be swapped with each other in the N-type MOS transistor example embodiment as opposed to the P-type MOS transistor example embodiment).

In the example embodiment of FIG. 6, the battery charger 630 may be positioned between the external power source 610 and the battery 650. The battery charger 630 may supply charges generated using the external power source 610 to the battery 650. The controller 640 may output a first control signal CON1 and the third control signal CON3, which may be enabled in the external power source mode, and a second control signal CON2, which may be enabled in the battery mode. In an example, only one of the first control signal CON1 and the second control signal CON2 may be enabled at any given time. The third control signal CON3 may be enabled at a time period preceding an enablement of the first control signal CON1, and the third control signal CON3 may be disabled concurrently with a disabling of the first control signal CON1. In an example, the time period of which the third control signal CON3 may be enabled before an enablement of the first control signal CON1 may be a settling time until the voltage Vc output from the voltage adjuster 620 may achieve the same voltage level as that of the output voltage Vb of the battery 650. The battery 650 may store the charges directly applied from the external power source 610, or alternatively the charges applied from the battery charger 630, and may output the voltage Vb corresponding to the stored charges.

In the example embodiment of FIG. 6, the first switch SW1 may switch the first power source voltage Vc supplied to a first end thereof in response to the first control signal CON1. The second switch SW2 may switch the output voltage Vb of the battery 650 connected to a first end thereof in response to the second control signal CON2. A second end of the first switch SW1 may be connected with a second end of the second switch SW2. The voltage output from the common node of the first switch SW1 and/or the second switch SW2 may be referred to as a switching voltage.

In the example embodiment of FIG. 6, the DC-DC converter 660 may generate a conversion voltage having a voltage level different from that of the switching voltage based on the switching voltage (e.g., an offset thereof). In an example, the voltage level of the switching voltage may be higher than that of the conversion voltage. The system load 670 may perform a given function using the conversion voltage output by the DC-DC converter 660.

Figure 7:
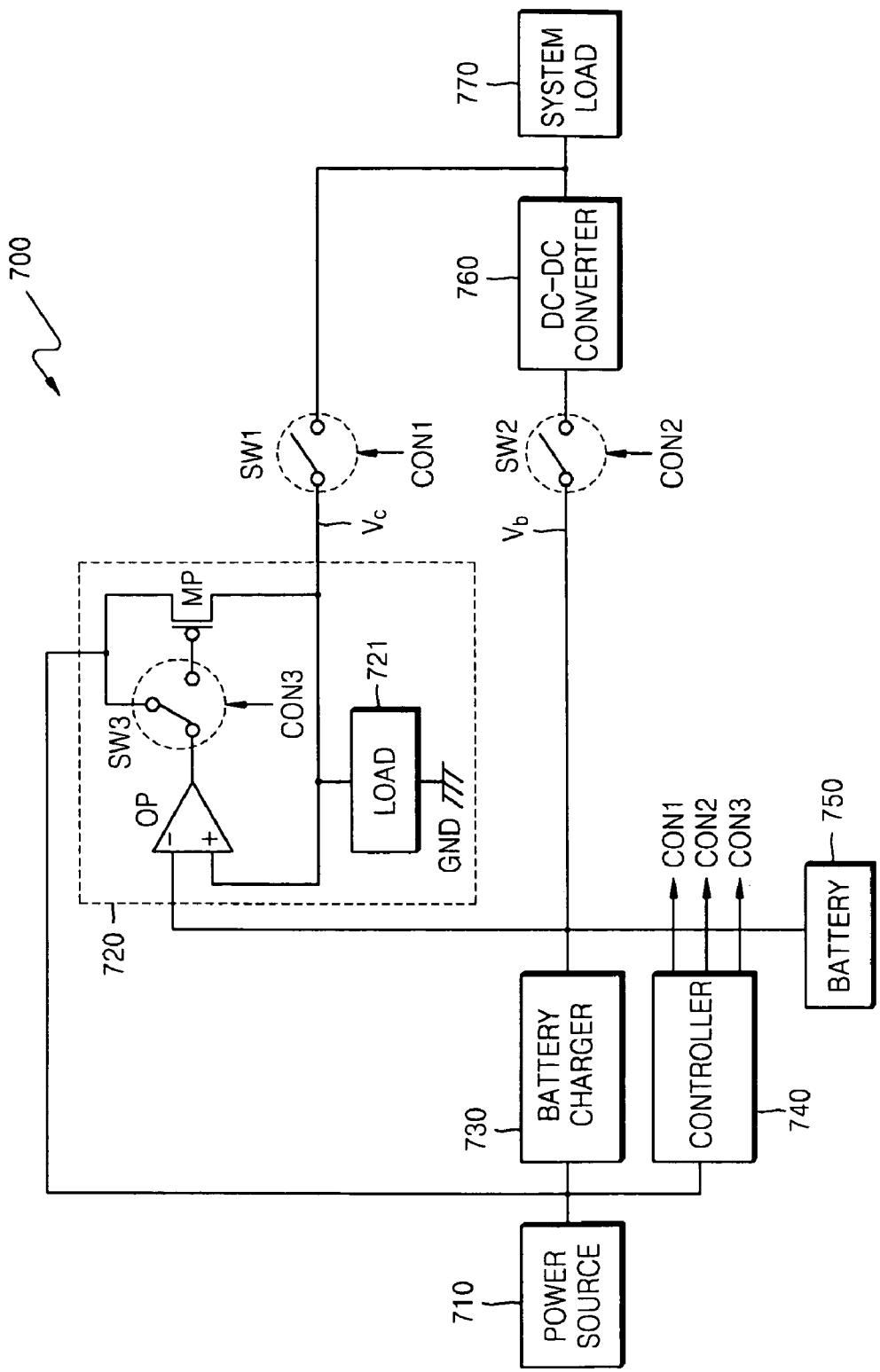
FIG. 7 illustrates a power source switching apparatus according to another example embodiment of the present invention.

FIG. 7 illustrates a power source switching apparatus 700 according to another example embodiment of the present invention.

In the example embodiment of FIG. 7, the power source switching apparatus 700 may include an external power source 710, a voltage adjuster 720, a battery charger 730, a controller 740, a battery 750, a DC-DC converter 760, a system load 770, a first switch SW1, and a second switch SW2. The example embodiment illustrated in FIG. 7 may be different from the example embodiment illustrated in FIG. 6 in that the two switches SW1 and SW2 may be connected to the DC-DC converter 760 and the system load 770, respectively. Accordingly, in the example embodiment of FIG. 7, the first switch SW1 may directly delivers the first voltage Vc to the system load 770 and the second switch SW2 deliver the output voltage Vb of the battery 750 to the DC-DC converter 760. The remaining elements present in the example embodiment of FIG. 7 may be generally identical to corresponding elements in the example embodiment of FIG. 6, and as such a further description thereof has been omitted for the sake of brevity.

In example operation of the power source switching apparatus 600 of FIG. 6, in the battery mode, the voltage Vb output from the battery 650 may be delivered to the DC-DC converter 660 via the second switch SW2, which may operate in response to the second control signal CON2. In the external power source mode, the first power source voltage Vc output from the voltage adjuster 620 may be delivered to the DC-DC converter 660 via the first switch SW1, which may operate in response to the first control signal CON1.

In example operation of the power source switching apparatus 700 of FIG. 7, in the battery mode, the voltage Vb output from the battery 750 may be delivered to the DC-DC converter 760 via the second switch SW2, which may operate in response to the second control signal CON2. In the external power source mode, the first power source voltage Vc output from the voltage adjuster 720 may be delivered to the system load 770 via the first switch SW1, which may operate in response to the first control signal CON1.

In each of the power source switching apparatuses 600 and 700 illustrated in the example embodiments of FIGS. 6 and 7, a power source voltage may not change rapidly during a transition between the battery mode and the external power source mode because voltage levels of the first power source voltages Vc output from the voltage adjusters 620 and 720 may be proximate (e.g., substantially equal) to those of the voltages Vb output from the charging batteries 650 and 750.

Figure 8:
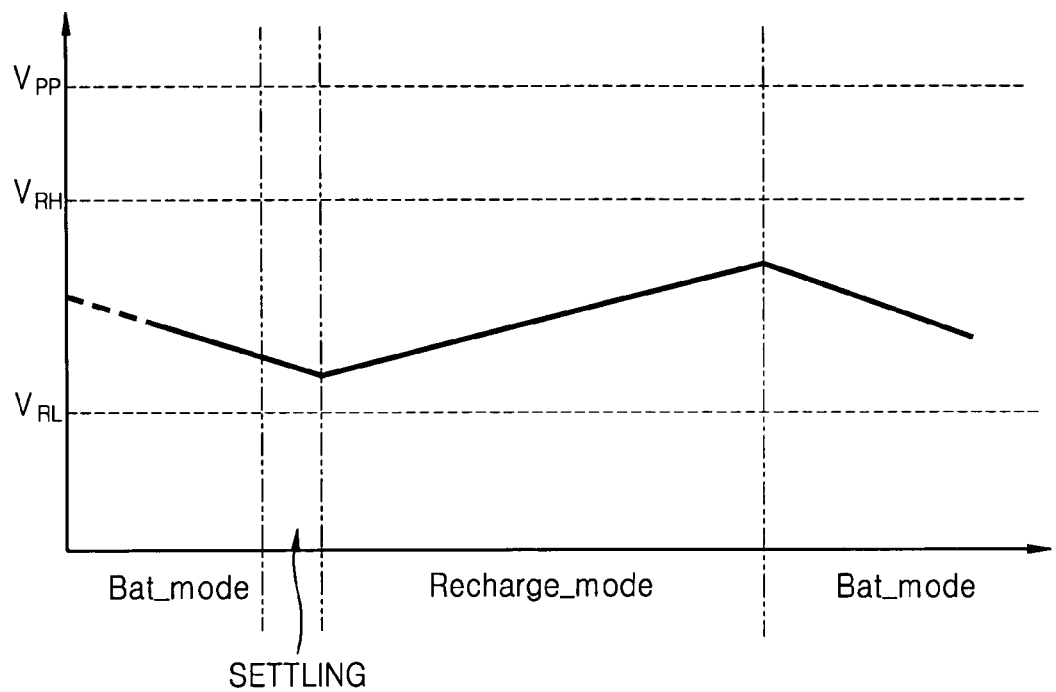
FIG. 8 illustrates a voltage level fluctuation of the power source voltage applied during a transition between the battery mode and the external power source mode according to an example embodiment of the present invention.

FIG. 8 illustrates a voltage level fluctuation of the power source voltage applied during a transition between the battery mode and the external power source mode according to an example embodiment of the present invention. In the example embodiment of FIG. 8, the power source voltage may be representative of the voltages applied to the DC-DC converters 460, 560, 660, and/or 760 and/or the system loads 470, 570, 670, and/or 770.

Figure 1:
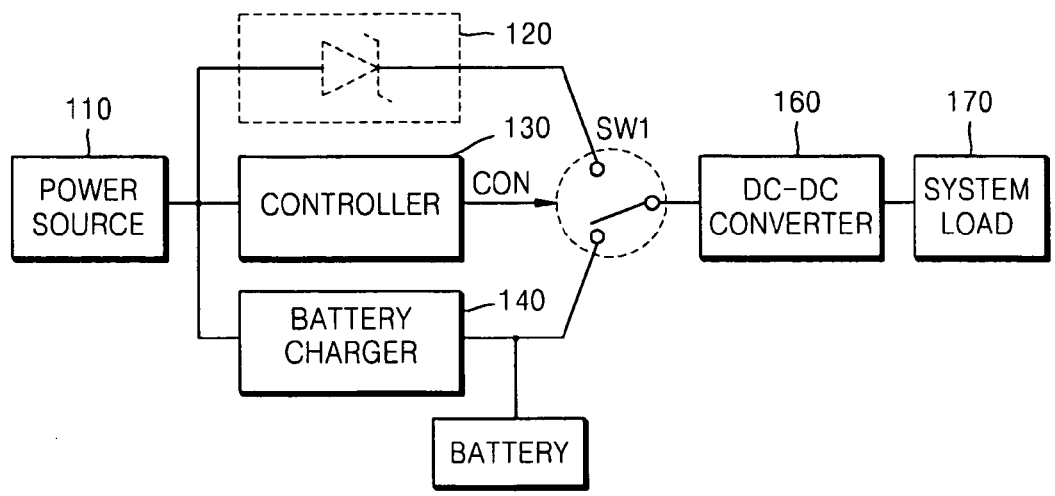
FIG. 1 is a block diagram illustrating a conventional portable mobile device.
Figure 2:
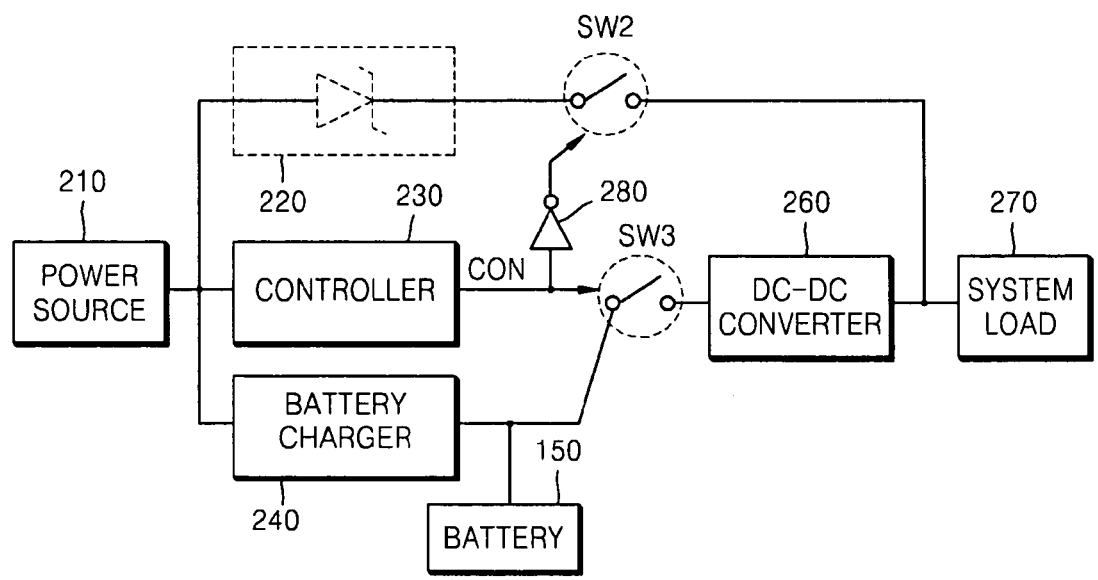
FIG. 2 is a block diagram illustrating another conventional portable mobile device.
Figure 3A:
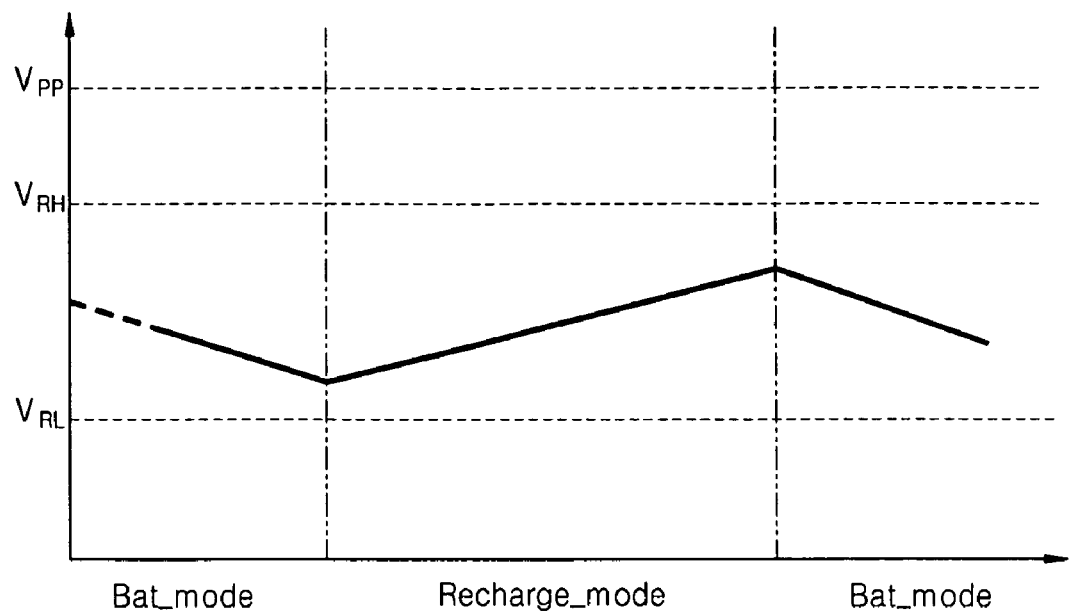
FIG. 3A illustrates a theoretical voltage level fluctuation of the power source voltage applied during a transition between the battery mode and the external power source mode.
Figure 3B:
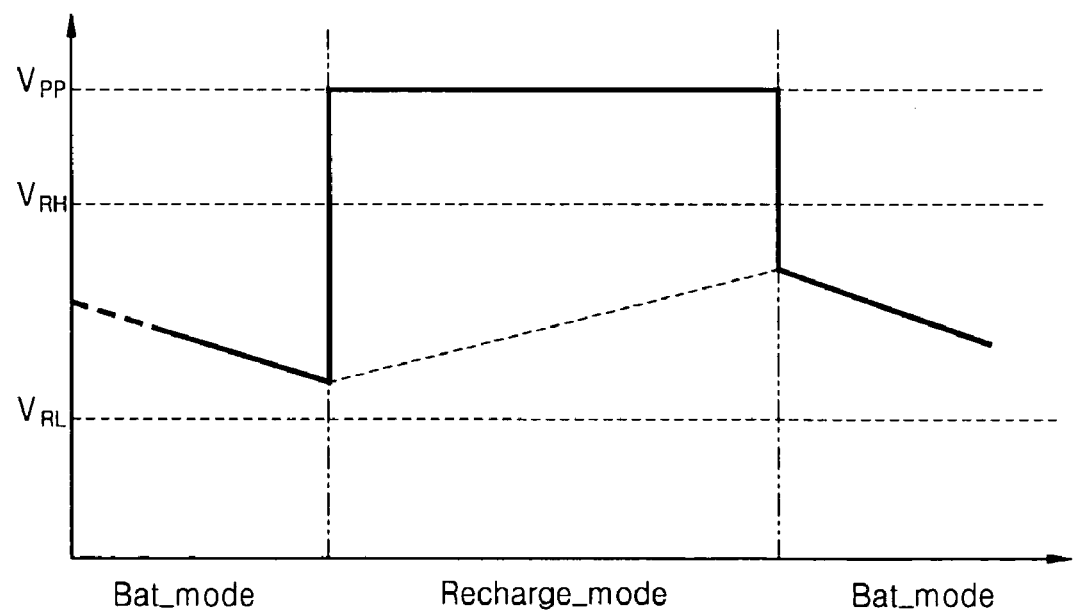
FIG. 3B illustrates a conventional voltage level fluctuation of the power source voltage applied during a transition between the battery mode and the external power source mode.
Figure 3C:
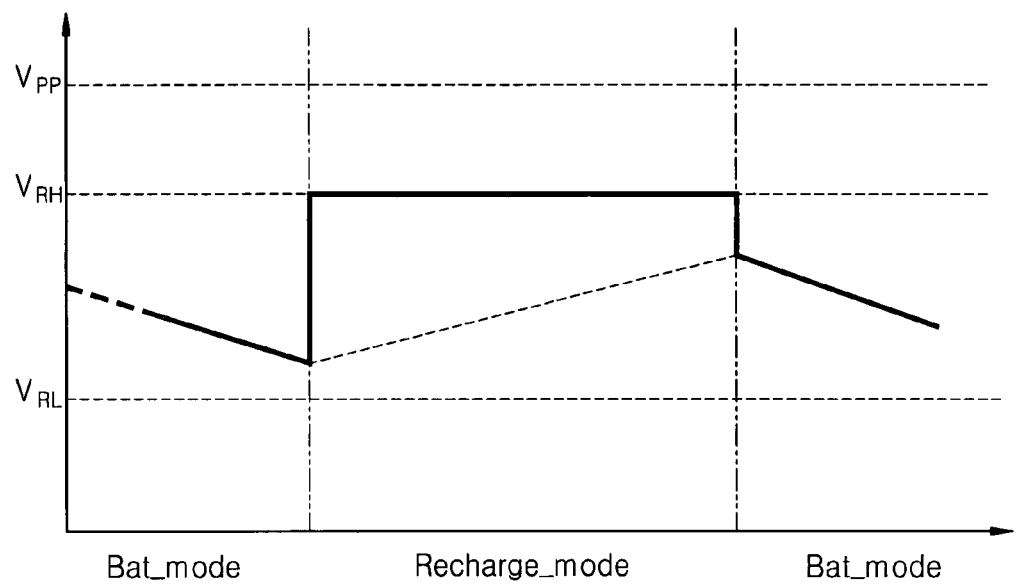
FIG. 3C illustrates another conventional voltage level fluctuation of the power source voltage applied during a transition between the battery mode and the external power source mode.

In the example embodiment of FIG. 8, the power source voltage of FIG. 8 may approximate the theoretical "ideal" voltage illustrated in FIG. 3A. In other words, the voltage level fluctuation illustrated in FIG. 8 may be relatively smooth in comparison to the conventional voltage level fluctuations illustrated in FIGS. 3B and 3C. Accordingly, referring to FIG. 8, if the battery mode Bat_mode is switched to the external power source mode Recharge_mode, the third control signal CON3 may be enabled such that the output voltage of the voltage adjuster may substantially match the output voltage of the battery before a given time period (e.g., settling time), thereby increasing system stability.

Example embodiments of the present invention being thus described, it will be obvious that the same may be varied in many ways. For example, while above-described example embodiments of the present invention are directed to maintaining a relatively stable voltage during a transition between battery powered operation and external power source powered operation, it will be readily apparent that other example embodiments of the present invention may deploy the above-described teachings to any scenario wherein a rapid voltage change is expected and/or increased voltage stability is desired.

Such variations are not to be regarded as a departure from the spirit and scope of example embodiments of the present invention, and all such modifications as would be obvious to one skilled in the art are intended to be included within the scope of the following claims.

What is claimed is:

1. A power source switching apparatus, comprising:
    a battery storing charges received from an external power source and outputting a voltage corresponding to the stored charges;
    a voltage adjuster outputting a first power source voltage during an external power source mode where the battery is being charged, the first power source voltage based at least in part on the external power source and the output voltage of the battery;
    a controller outputting a first control signal and a second control signal, the first control signal enabled if the battery is operating in the external power source mode and the second control signal is enabled if the battery is not operating in the external power source mode;
    a first switch outputting the first power source voltage if the first control signal is enabled; and
    a second switch outputting the output voltage of the battery if the second control signal is enabled,
    wherein the first power source voltage has the same level as that of the output voltage of the battery and the level of the first power source voltage increases corresponding to the level of output voltage of the battery while the battery is being charged, and
    wherein the controller further outputs a third control signal, the third control signal enabled if the battery is operating in an external power source mode, the voltage adjuster outputting the first power source voltage further based on the third control signal.

2. The power source switching apparatus of claim 1, further comprising:
    a battery charger positioned between the external power source and the battery, the battery charger supplying charges received from the external power source to the battery.

3. The power source switching apparatus of claim 1, wherein the voltage adjuster includes:
    an operational amplifier including a first input terminal receiving the output voltage of the battery; and
    a MOS transistor including a source terminal connected to the external power source, a drain terminal connected to a second input terminal of the operational amplifier, and a gate terminal receiving an output voltage of the operational amplifier.

4. The power source switching apparatus of claim 3, wherein the voltage adjuster further includes:
    a load including a first terminal connected to a node for connecting the second input terminal of the operational amplifier with the drain terminal of the MOS transistor, and a second terminal connected to a ground voltage.

5. The power source switching apparatus of claim 1, further comprising:
a direct current (DC)-DC converter generating a conversion voltage having a voltage level different from that of a switching voltage output by one of the first and second switches, the conversion voltage based on one or more of the first power source voltage output by the first switch and the output voltage output by the second switch.

6. The power source switching apparatus of claim 5, wherein a voltage level of the switching voltage is higher than that of the conversion voltage.

7. The power source switching apparatus of claim 1, further comprising:
a direct current (DC)-DC converter generating a conversion voltage having a voltage level different from that of a first switching voltage output by the second switch; and
a system load performing a function using the conversion voltage output from the DC-DC converter and a second switching voltage output from the first switch.

8. The power source switching apparatus of claim 7, wherein a voltage level of the first switching voltage is higher than that of the conversion voltage.

9. The power source switching apparatus of claim 1, wherein the voltage adjuster comprises:
an operational amplifier including a first input terminal receiving the output voltage of the battery; and
a MOS transistor including a source terminal connected to the external power source, a drain terminal connected to a second input terminal of the operational amplifier;
a third switch outputting one of the output voltage of the external power source and an output voltage of the operational amplifier to a gate terminal of the MOS transistor in response to the third control signal.

10. The power source switching apparatus of claim 9, wherein the voltage adjuster further includes:
a load including a first terminal connected to a node for connecting the second input terminal of the operational amplifier with the drain terminal of the MOS transistor, and a second terminal connected to a ground voltage.

11. The power source switching apparatus of claim 10, wherein the load further includes:
a capacitor including a first terminal connected to a node for connecting the second input terminal of the operational amplifier with the drain terminal of the MOS transistor, and a second terminal connected to the ground voltage.

12. The power source switching apparatus of claim 11, wherein the load further includes:
a resistor connected to the capacitor in parallel.

13. The power source switching apparatus of claim 1, wherein only one of the first control signal and the second control signal is enabled at any given time.

14. The power source switching apparatus of claim 1, wherein only one of the first control signal and the second control signal is enabled at any given time, and the third control signal is enabled at a given time period before the first control signal is enabled and is disabled at the concurrently with a disabling of the first control signal.

15. The power source switching apparatus of claim 14, wherein the given time period corresponds to a settling time until the first power source voltage has a voltage level substantially matching that of the battery.

16. The power source switching apparatus of claim 1, further comprising:
a direct current (DC)-DC converter generating a conversion voltage having a voltage level different from that of a switching voltage, the switching voltage output from a common node connected to each of the first switch and the second switch.

17. The power source switching apparatus of claim 16, wherein the voltage level of the switching voltage is higher than that of the conversion voltage.

18. The power source switching apparatus of claim 1, further comprising:
a direct current (DC)-DC converter generating a conversion voltage having a voltage level different from that of a first switching voltage output by the second switch; and
a system load performing a function using the conversion voltage output from the DC-DC converter and a second switching voltage output from the first switch.

19. The power source switching apparatus of claim 18, wherein the voltage level of the first switching voltage is higher than that of the conversion voltage.

20. A method of providing power, comprising:
storing charges received from an external power source in a battery;
providing a first power source voltage corresponding to the stored charges, the first power source voltage being the output voltage of the battery; and
providing a second power source voltage during an external power source mode where the battery is being charged, the second power source voltage being output using a voltage adjuster based at least in part on the external power source and a voltage level of the first power source voltage and not being provided from the battery;
outputting a first control signal, a second control signal, and a voltage adjuster control signal, the first control signal and a voltage adjuster control signal being enabled if a battery is operating in the external power source mode, the second control signal being enabled if the battery is not operating in the external power source mode;
outputting the second power source voltage using a first switch if the first control signal is enabled; and
outputting the first power source voltage using a second switch if the second control signal is enabled,
wherein the second power source voltage has the same level as that of the first power source voltage of the battery and the level of the second power source voltage increases corresponding to the level of the first power source voltage of the battery while the battery is charged,
wherein the voltage adjuster outputting the second power source voltage is further based on the voltage adjuster control signal.

21. The method of claim 20, wherein the external power source voltage is higher than one or more of the first and second power source voltages.

22. The method of claim 20, wherein the second power source voltage is provided during a period of transition between a battery mode and an external power source mode.

23. A power source switching apparatus performing the method of claim 20.

24. A power source switching apparatus, comprising:
a battery storing charges received from an external power source and outputting a voltage corresponding to the stored charges;
a voltage adjuster outputting a first power source voltage during an external power source mode where the battery is being charged, the first power source voltage based at least in part on the external power source and the output voltage of the battery;

a controller outputting a first control signal and a second control signal, the first control signal enabled if the battery is operating in the external power source mode and the second control signal is enabled if the battery is not operating in the external power source mode;

a first switch outputting the first power source voltage if the first control signal is enabled; and a second switch outputting the output voltage of the battery if the second control signal is enabled, wherein the first power source voltage has the same level as that of the output voltage of the battery and the level of the first power source voltage increases corresponding to the level of output voltage of the battery while the battery is being charged, wherein the voltage adjuster includes an operational amplifier including a first input terminal receiving the output voltage of the battery; and a MOS transistor including a source terminal connected to the external power source, a drain terminal connected to a second input terminal of the operational amplifier, and a gate terminal receiving an output voltage of the operational amplifier.

* * * * *